United States Patent [19]

Scales et al.

[11] 4,228,339
[45] Oct. 14, 1980

[54] METHOD OF HARDFACING TOOL JOINTS

[75] Inventors: Stanley R. Scales; Eric C. Sullivan, both of Houston, Tex.

[73] Assignee: Hughes Tool Company, Houston, Tex.

[21] Appl. No.: 974,168

[22] Filed: Dec. 28, 1978

[51] Int. Cl.³ .............................................. B23K 9/04
[52] U.S. Cl. .................................. 219/77; 219/73.21; 219/76.15; 219/128
[58] Field of Search .................... 219/77, 73.21, 76.14, 219/76.15, 76.12, 128; 175/375; 427/277

[56] References Cited
U.S. PATENT DOCUMENTS

| | | | |
|---|---|---|---|
| 2,709,213 | 7/1955 | Gibson | 219/73.21 |
| 3,405,247 | 10/1968 | Hliuka | 219/73.21 |

Primary Examiner—Elliot A. Goldberg
Attorney, Agent, or Firm—Robert A. Felsman

[57] ABSTRACT

An improved method for hardfacing tool joints for earth boring drill pipe. Annular bands of hardfacing are applied by an apparatus that creates an arc between a consumable steel wire and the tool joint. The steel wire is reciprocated across the width of the band as the tool joint is rotated. Granules of tungsten carbide flow by gravity from a hopper into the weld puddle. The flow of granules into the puddle is stopped just prior to reaching the tie-in point. The arc continues a short distance, creating an overlapping protuberance at the tie-in that is free of granules at the surface. This protuberance can be easily ground smooth with the remainder of the hardfacing.

4 Claims, 5 Drawing Figures

METHOD OF HARDFACING TOOL JOINTS

BACKGROUND OF THE INVENTION

1. Field of the Invention:

This invention relates in general to earth boring drill pipe, and in particular to hardfacing the connection members on the drill pipe.

2. Description of the Prior Art:

The most common drill pipe used in earth boring operations have connection members or tool joints on each end that are larger in diameter than the drill pipe. Annular bands of hardfacing are commonly deposited on each tool joint. One type of hardfacing has macroscopic sintered tungsten carbide granules within an alloy steel matrix. Sintered tungsten carbide granules, as explained in U.S. Pat. No. 3,800,891, comprise microscopic grains of tungsten carbide held together by a binder of an iron group metal, usually cobalt. Sintered tungsten carbide hardfacing is normally applied on tool joints by rotating the tool joint, providing an arc with a consumable steel wire, discharging an inert gas around the wire, and gravity feeding sintered tungsten carbide granules into the weld puddle behind the wire.

One disadvantage of the resulting sintered tungsten carbide hardfacing is that many of the granules remain only partially embedded in the matrix, giving a rough, abrasive exterior. In deep wells, intermediate strings of casing are set as the well is drilled. While drilling deeper through a string of intermediate casing, the rough surface of the hardfacing can abrade and damage the casing. Consequently, it is advantageous to have a hardfacing surface free of protruding tungsten carbide granules. In pending application Ser. No. 790,795 filed Apr. 25, 1977, entitled "SURFACE SMOOTHED TOOL JOINT HARDFACING", a method and apparatus is shown for hardfacing tool joints using tungsten carbide granules that results in a smooth exterior. The granules are dropped directly into the arc, rather than behind the arc. This concentrates the granules toward the bottom of the hardfacing deposit and results in a harder matrix near the bottom, as well.

One problem of this method occurs at the tie-in of the weld. The arc creates a generally circular puddle. It is oscillated less than the width of the groove or band to avoid overflow of hardfacing onto the other grooves. This results in a curved initiation point as seen in a side elevational view. To avoid a bare spot, the initiation point is overlapped slightly. This creates a slight protuberance at the tie-in. During the overlapping, the granules continue to fall unitl the arc is stopped, and shortly thereafter. As a result, granules fall into the puddle as it cools, and become embedded in the surface of the deposit. It is desired to have a smooth surface hardfacing of uniform thickness. Grinding this protuberance is difficult because of the granules embedded in the surface. For example, grinding of the protuberances of a typical tool joint may take 10 to 15 minutes, while the hardfacing application may take only 6 to 8 minutes.

SUMMARY OF THE INVENTION

It is accordingly a general object of this invention to provide an improved method of hardfacing a tool joint for earth boring drill pipe.

It is the further object of this invention to provide an improved method of hardfacing a tool joint for earth boring drill pipe in which the overlapped area at the tie-in is easily grindable.

It is the further object of this invention to provide an improved method of hardfacing a tool joint for earth boring drill pipe in which the overlap at the tie-in is free of tungsten carbide granules at the surface.

In accordance with these objects, a new and useful hardfacing method is provided in which a timer controls the wheel conveyor that feeds the granules from the hopper into the conduit that extends from the hopper to the weld puddle. The timer is set to stop the conveyor wheel just before the arc reaches the initiation point. The arc continues on a short distance to create the protuberance at the overlap. This protuberance, however, is free of granules at the surface since the conveyor wheel ceased movement prior to the tie-in point. The lack of granules at the surface allows the protuberance to be easily ground.

DESCRIPTION OF THE PREFERRED EMBODIMENT

Figure 1:
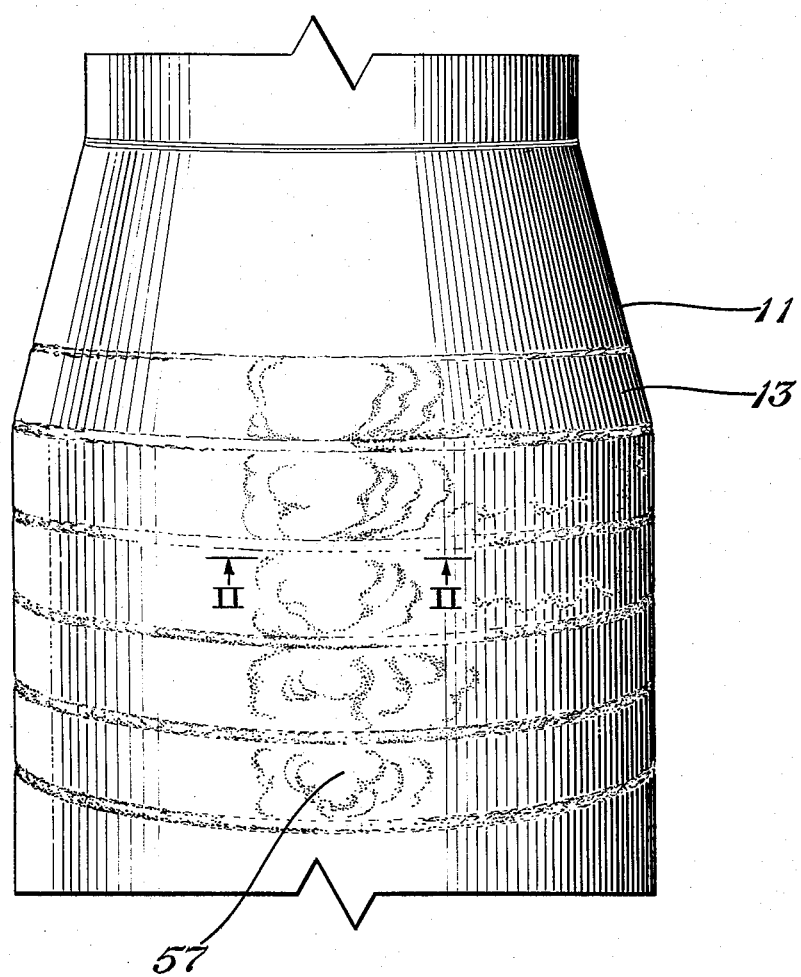
FIG. 1 is a side elevational view of a portion of a tool joint constructed in accordance with this invention, and prior to grinding of the protuberances.
Figure 5:
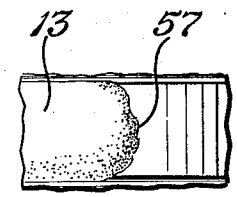
FIG. 5 is a side elevational view of a single band of the tool joint of FIG. 1, shown prior to completion and overlapping of the band.
Figure 2:
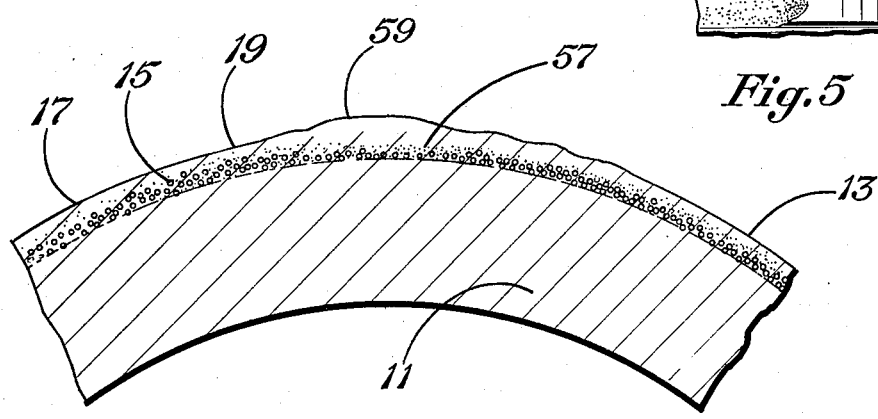
FIG. 2 is a sectional view of the tool joint of FIG. 1, taken along the line II—II.

Referring to FIG. 1, a portion of a tool joint 11 is shown with annular bands 13 of hardfacing. As shown in FIG. 2, sintered tungsten carbide granules 15 are embedded in the matrix 17 of the hardfacing deposit. The surface 19 is smooth and is substantially free of protruding granules 15. This hardfacing has been deposited by a hardfacing apparatus 21, shown partially in FIG. 3.

Apparatus 21 includes means (not shown) for holding the tool joint 11 in a horizontal position and for rotating it in the direction shown by arrow 23. A guide member 25 is mounted with its lower surface above the tool joint 11 approximately 3/4 inch. A consumable steel wire 27 is mounted on a driven roller 29 that feeds the wire through the center of guide member 25 toward the tool joint. The lower tip of wire 27 is positioned approximately 1/8 inch from the surface of tool joint 11, leaving approximately 5/8 inch of wire exposed. The longitudinal axis of the tool guide member 25 is inclined at an angle of approximately 23 degrees with respect to the vertical. Wire 27 serves as an electrode, and the point at which the arc is generated between wire 27 and the tool joint surface is spaced from top dead center a circumferential distance equal to an angle of approximately 13 degrees with respect to the vertical. Top dead center is a point at which a vertical plane passes through the tool joint exterior surface and the longitudinal axis of the tool joint.

An inert gas, preferably argon and designated as numeral 31, is discharged from guide member 25 and envelopes wire 27. Means (not shown) are included in the apparatus to reciprocate the wire 27 across the width of the band 13, parallel to the longitudinal axis of the tool.

Figure 3:
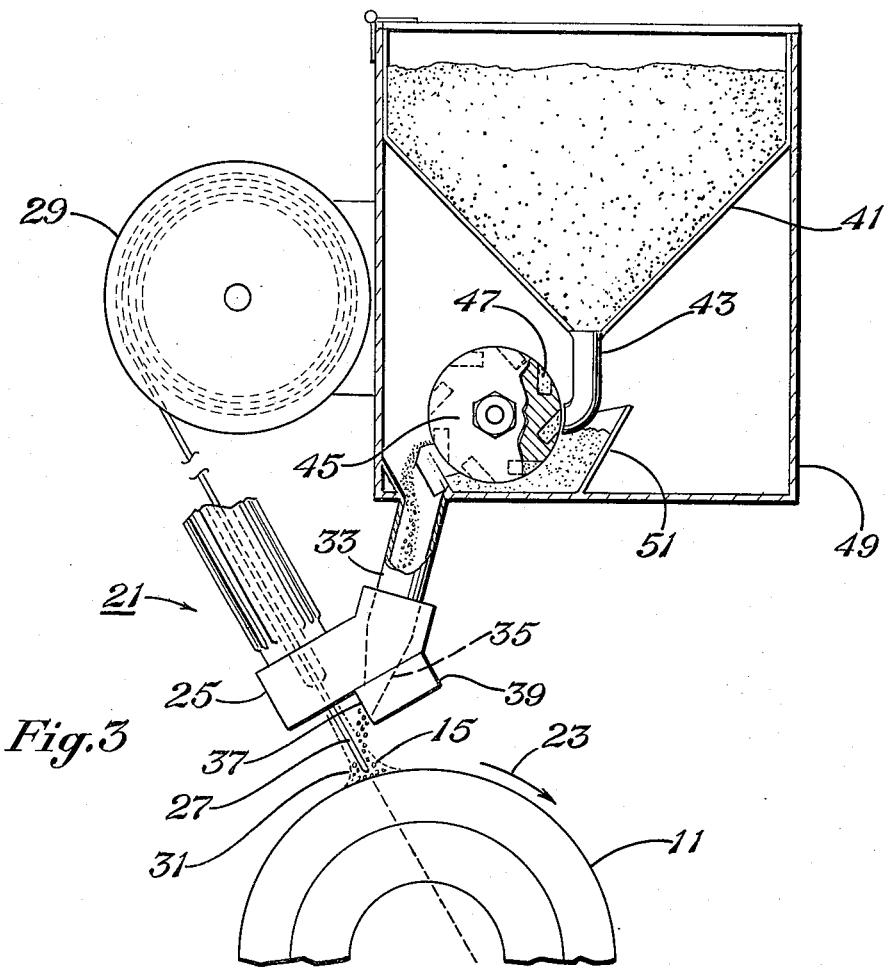
FIG. 3 is a generally schematic end view of the apparatus for hardfacing the tool joint of FIG. 1.

As shown in FIG. 3, granules of sintered tungsten carbide 15 are gravity fed from a conduit or a tube 33, which is attached to guide member 25 and inclined with respect to it. Granules 15 are fed through an orifice 35 of tube 33, then through an orifice 37 of an extension block 39, and onto the surface of tool joint 11. Orifice 37 extends flush from orifice 33 at the same angle of inclination. The forward edge of orifice 37 is positioned approximately ¼ inch from wire 27. The angle of inclination of orifice 37 is selected so that most of the granules 15 will fall directly into the arc, as shown in FIG. 3. In order to achieve the desired densities, orifices 35 and 37 must be of certain cross-sectional areas, consequently, although concentrated, a certain amount of the particles will not fall directly into the arc, but will fall in close proximity to it.

A hopper 41 for holding granules 15 is mounted above the tool joint 11. Hopper 41 has an outlet tube 43 at its bottom. A driven conveyor wheel 45 is mounted adjacent the discharge end of the outlet tube 43. Wheel 45 has a plurality of receptacles 47 on its edge for conveying granules. Wheel 45 rotates by the end of the outlet tube 43 for picking up the granules as they fall out. Wheel 45 and hopper 41 are carried in a case 49. The upper end of tube 33 terminates at the bottom of case 49 at a place where it receives granules conveyed by the wheel 45 as it rotates. A tray 51 surrounds the wheel 45, outlet 43, and entrance to tube 33 to receive granules that overflow receptacles 47.

Figure 4:
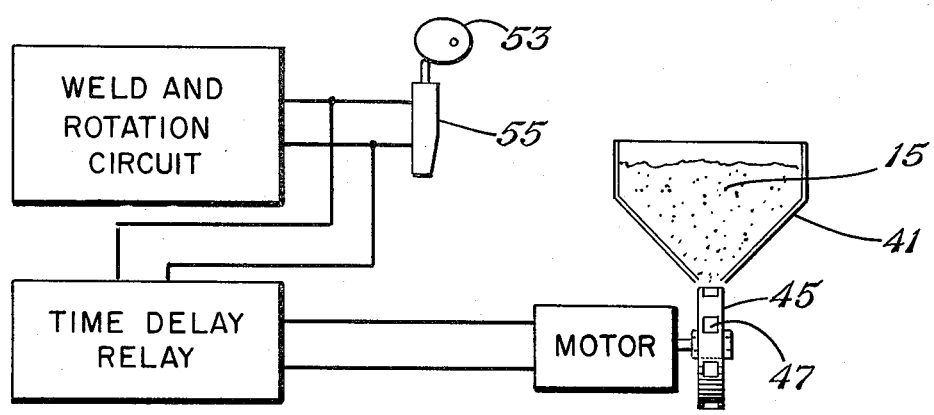
FIG. 4 is a schematic diagram of a portion of the apparatus of FIG. 3.

As shown in FIG. 4, the apparatus includes a motor for rotating wheel 45. A weld and rotation circuit provides the arc and rotates the tool joint. A cam 53 is mechanically driven by the same apparatus that rotates the tool joint. Cam 53 is driven by a sprocket (not shown) with slightly different number of teeth than the drive sprocket (not shown) for the tool joint rotating mechanism. This causes it to rotate slightly faster than the tool joint. Cam 53 is adapted to actuate a limit switch 55 once each revolution. The rotational speed of cam 53 with respect to the tool joint rotation is selected so that it will complete its cycle and activate the limit switch 55 about 36 degrees before the arc starts its tie-in at the initiating point 57. Limit switch 55 signals two time delay relays, one of which allows the wheel 45 motor to revolve only a selected amount of time after the limit switch 55 is activated, the other of which allows the arc to continue only a selected time interval after the limit switch 55 is activated. The arc time delay relay is slightly longer, typically about two seconds, than the wheel 45 motor time delay relay to avoid granules falling into the weld puddle after the arc has started its tie-in at the arc initiating point.

In operation, granules of sintered tungsten carbide containing 5% to 7% cobalt are preferred, although other ranges and iron group binders are also feasible. One preferred size is minus 14 mesh to plus 30 mesh. To achieve a desired hardfacing density of 0.022 pounds per square inch, orifice 37 is approximately ⅛ inch wide and ⅛ inch high. Tool joint 11 is rotated at approximately one rotation per minute, which is about 20-22 circumferential inches per minute. The guide member is reciprocated 85 to 95 oscillations per minute along a ⅞ inch stroke. A slight overlap provides bands of ¾ inch width. An arc is struck to create a weld puddle, the temperatures generated being approximately 5000° F. Argon gas containing 5% oxygen is pumped into the arc. Wheel 45 commences rotation substantially at the same time as the arc is created, dropping granules of sintered tungsten carbide into the weld puddle at the arc. Preferably 0.5 to 0.6 pounds per minute of sintered carbide granules are fed into the weld puddle to achieve the desired density. The deposit averages 0.10 inch in thickness. FIG. 2 shows the appearance of the initiating point 57 prior to the tie-in, it being gradually curved at the edges.

The hardfacing continues as the tool and cam 53 rotate. The cam achieves a full revolution approximately when the tool joint has rotated about 324 degrees from initiating point 57. At this point cam 53 actuates limit switch 55, which in turn signals the wheel 45 motor time delay relay and the time delay relay for the arc. Slightly before the initiating point 57, the wheel motor is stopped by its time delay relay, ceasing the flow of granules into the puddle. Approximately two seconds later, the arc is stopped by its time delay relay. This overlap of about ¼ inch results in a protuberance 59, FIG. 2, that is substantially free of any granules at the surface. This protuberance can be easily ground smooth within 1/32 inch of the remainder of the hardfacing band. Grinding takes only approximately one minute for the entire tool joint.

The resulting product has a surface free of protruding granules. Some of the granules are embedded near the surface, but substantially all of each granule is below the surface. Most of the granules are concentrated toward the bottom of the hardfacing deposit. The deposit contains approximately 50% sintered tungsten carbide granules and 50% matrix by weight.

The wheel serves as valve means for allowing and permitting the flow of granules into the conduit. The wheel motor time delay relay, cam, and limit switch serve as means for automatically actuating the valve means to stop the flow of granules into the weld puddle.

The precise point at which the flow of granules ceases is not critical, although it is preferred to avoid any portions that do not contain any granules. Preferably the point at which granules cease to flow is within ¼ inch or so of the initiating point. The cam and limit switch allow the operator to vary the speed of hardfacing over most of the band while it is being applied to achieve the best results. Varying the speed prior to actuation of the limit switch will not affect the time delay relays.

It should be apparent that an invention having significant advantages has been provided. The method provides smooth surface hardfacing for tool joints that can be ground at the tie-in to provide uniform thickness.

While the invention has been shown in only one of its forms, it should be apparent to those skilled in the art that it is not so limited but is susceptible to various changes and modifications without departing from the spirit thereof.

I claim:

1. An improved method for applying annular bands of hardfacing on a tool joint for earth boring drill pipe, the hard facing having tungsten carbide granules in an alloy steel matrix, the method including the steps of rotating the tool joint, providing an arc between an electrode and the tool joint to create a weld puddle, reciprocating the electrode parallel to the tool joint axis, and feeding the granules by gravity into the weld puddle, the improvement comprising:

stopping the flow of granules into the puddle just before the tie-in at the end of each hardfacing band, but continuing the arc and tool joint rotation a selected distance to provide an overlapped protuberance at the tie-in that is substantially free of granules at the surface, allowing the protuberance to be easily ground.

2. An improved method for applying annular bands of hardfacing on a tool joint for earth boring drill pipe, the hardfacing having sintered tungsten carbide granules in an alloy steel matrix, the method included the steps of rotating the tool joint while providing an arc between a consumable steel wire and the tool joint within a stream of substantially inert gas to create a weld puddle, reciprocating the wire parallel to the tool joint axis, and feeding the granules by gravity into the weld puddle, the improvement comprising:

stopping the flow of granules just before the arc reaches its initiating point, but continuing the arc a selected distance past the initiating point to provide an overlapping protuberance that is substantially free of granules at the surface, allowing the protuberance to be easily ground flush with the remainder of the band.

3. An improved method for applying annular bands of hardfacing on a tool joint for earth boring drill pipe, the hardfacing having sintered tungsten carbide granules in an alloy steel matrix, the method including the steps of rotating the tool joint while providing an arc between a consumable steel wire and the tool joint within a stream of substantially inert gas to create a weld puddle, reciprocating the wires parallel to the tool joint axis, and feeding the granules by gravity into the weld puddle, the improvement comprising:

initiating a timer means prior to reaching the initiating point at which the arc commenced for automatically stopping the flow of granules just before reaching the initiation point of the arc at the end of each hardfacing band, but continuing the arc and tool joint rotation a selected distance to provide an overlapping protuberance at the initiating point that is substantially free of granules at the surface, allowing the protuberance to be easily ground flush with the remainder of the band.

4. An improved method for applying annular bands of hardfacing to a tool joint for earth boring drill pipe, comprising:

rotating the tool joint;

providing an arc between a consumable steel wire and the tool joint within a stream of substantially inert gas to create a weld puddle;

reciprocating the wire parallel to the tool joint axis substantially the width of the band;

mounting a hopper above the tool joint for holding granules of tungsten carbide, with an outlet at its bottom;

mounting a rotating wheel below the hopper outlet, the wheel having a receptacle for receiving granules and conveying them over to a conduit that extends downwardly to a point near the tool joint;

rotating the wheel substantially at the initiation of the arc to cause granules to flow down the conduit into the weld puddle;

stopping the wheel immediately prior to reaching the point at which arc commenced, while the tool joint continues to rotate and the arc continues, to provide an overlapping protuberance substantially free of granules to allow it to be easily ground.

* * * * *

UNITED STATES PATENT OFFICE
CERTIFICATE OF CORRECTION

Patent No. 4,228,339         Dated   October 14, 1980

Inventor(s)  STANLEY R. SCALES and ERIC C. SULLIVAN

It is certified that error appears in the above-identified patent and that said Letters Patent are hereby corrected as shown below:

Delete Claims 1 through 4 as printed and insert therefor Claim 1 through 4 as follows:

CLAIMS:

1. An improved method for applying annular bands of hardfacing on a tool joint for earth boring drill pipe, the hardfacing having tungsten carbide granules in an alloy steel matrix, the method including the steps of rotating the tool joint, providing an arc between an electrode and the tool joint to create a weld puddle, reciprocating the electrode parallel to the tool joint axis, and feeding the granules by gravity into the weld puddle, the improvement comprising:

stopping the flow of granules into the puddle just before the band overlaps itself about the circumference of the tool joint after one revolution of the tool joint, but continuing the arc and tool joint rotation a selected distance to provide an overlapped protuberance of the band that is substantially free of granules at the surface, allowing the protuberance to be easily ground.

2. An improved method for applying annular bands of hardfacing on a tool joint for earth boring drill pipe, the hardfacing having sintered tungsten carbide granules in an alloy steel matrix, the method including the steps of rotating the tool joint while providing an arc between a consumable steel wire and the tool joint within a stream of substantially inert gas to create a weld puddle, reciprocating the wire parallel to the tool joint axis, and feeding the granules by gravity into the weld puddle, the improvement comprising:

stopping the flow of granules just before the arc reaches its original initiating point on the circumference of the tool joint after one revolution of the tool joint, but continuing the arc a selected distance past the original initiating point to provide an

UNITED STATES PATENT OFFICE
CERTIFICATE OF CORRECTION

Patent No. 4,228,339     Dated October 14, 1980

Inventor(s) STANLEY R. SCALES and ERIC C. SULLIVAN

It is certified that error appears in the above-identified patent and that said Letters Patent are hereby corrected as shown below:

overlapping protuberance of the band that is substantially free of granules at the surface, allowing the protuberance to be easily ground flush with the remainder of the band.

3. An improved method for applying annular bands of hardfacing on a tool joint for earth boring drill pipe, the hardfacing having sintered tungsten carbide granules in an alloy steel matrix, the method including the steps of rotating the tool joint while providing an arc between a consumable steel wire and the tool joint within a stream of substantially inert gas to create a weld puddle, reciprocating the wire parallel to the tool joint axis, and feeding the granules by gravity into the weld puddle, the improvement comprising:

initiating a timer means prior to reaching the initiating point at which the arc commenced for automatically stopping the flow of granules just before reaching the initiation point of the arc at the end of each hardfacing band, but continuing the arc and tool joint rotation a selected distance to provide an overlapping protuberance of the band at the initiating point that is substantially free of granules at the surface, allowing the protuberance to be easily ground flush with the remainder of the band.

4. An improved method for applying annular bands of hardfacing to a tool joint for earth boring drill pipe, comprising:
    rotating the tool joint;
    providing an arc between a consumable steel wire and the tool joint within a stream of substantially inert gas to create a weld puddle;
    reciprocating the wire parallel with the tool joint axis substantially the width of the band;
    mounting a hopper above the tool joint for holding granules of tungsten carbide, with an outlet at its bottom;

UNITED STATES PATENT OFFICE
CERTIFICATE OF CORRECTION

Patent No. 4,228,339     Dated October 14, 1980

Inventor(s) STANLEY R. SCALES and ERIC C. SULLIVAN

It is certified that error appears in the above-identified patent and that said Letters Patent are hereby corrected as shown below:

mounting a rotating wheel below the hopper outlet, the wheel having a receptacle for receiving granules and conveying them over to a conduit that extends downwardly to a point near the tool joint;
    rotating the wheel substantially at the initiation of the arc to cause granules to flow down the conduit into the weld puddle;
    stopping the wheel immediately prior to reaching the point at which arc commenced after a band has been applied about the circumference of the tool joint, while the tool joint continues to rotate and the arc continues, to provide an overlapping band protuberance substantially free of granules to allow it to be easily ground.

Signed and Sealed this

Sixteenth Day of June 1981

[SEAL]

*Attest:*

RENE D. TEGTMEYER

*Attesting Officer*     *Acting Commissioner of Patents and Trademarks*